127,429

UNITED STATES PATENT OFFICE.

CHRISTIAN RECK, OF NEAR FLORAVILLE, ILLINOIS.

IMPROVEMENT IN LUBRICATING COMPOUNDS.

Specification forming part of Letters Patent No. 127,429, dated June 4, 1872.

Specification describing a certain Compound called "St. Clair Lubricator," invented by CHRISTIAN RECK, of near Floraville, St. Clair county, Illinois, to be used for lubricating vehicles and machinery.

The nature of the invention of the said CHRISTIAN RECK consists in mixing resin, lime, lard, turpentine, and water.

To prepare the "St. Clair Lubricator," take about two hundred pounds of resin and distil the same in an ordinary still; take the production of the distillation and put the same into a kettle; add about ten pounds of lime, about twelve pounds of lard, about two gallons of turpentine, about three gallons of water, and boil about one-half hour.

It is the peculiar property of this composition that it remains of equal consistency in every temperature; it does not melt in the heat; nor does it become firmer in the cold; and it does not clog.

I claim as my invention—

A compound composed of the above materials, substantially in the proportions and for the purposes set forth.

CHRISTIAN RECK.

Witnesses:
FRANK RIESENBERGER,
CHARLES SPIER.